UNITED STATES PATENT OFFICE.

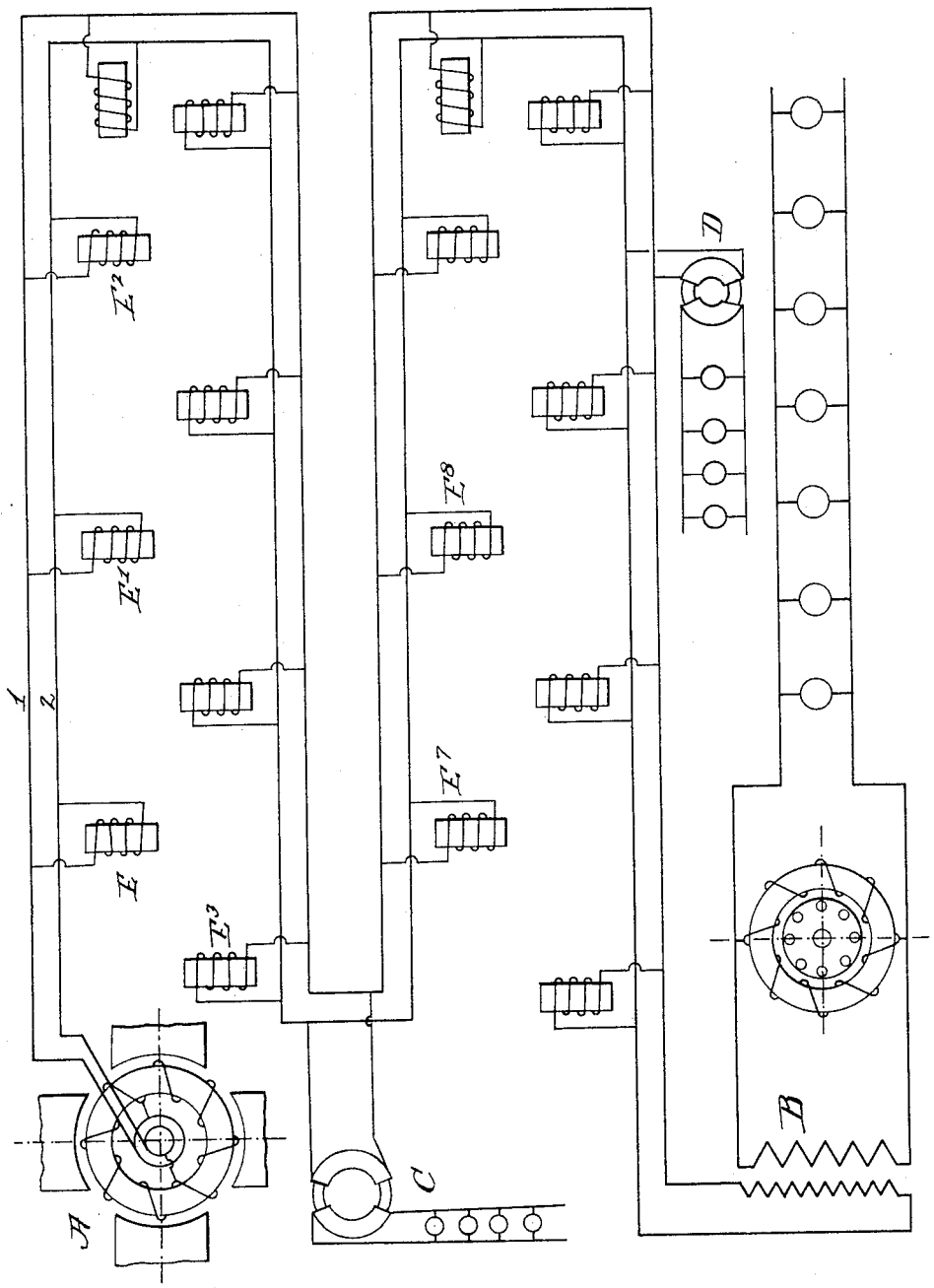

CHARLES S. BRADLEY, OF AVON, NEW YORK, ASSIGNOR TO THE GENERAL ELECTRIC COMPANY, OF NEW YORK.

TRANSMISSION OF ENERGY BY ALTERNATING CURRENTS.

SPECIFICATION forming part of Letters Patent No. 589,556, dated September 7, 1897.

Application filed March 21, 1896. Serial No. 584,337. (No model.)

*To all whom it may concern:*

Be it known that I, CHARLES S. BRADLEY, a citizen of the United States, and a resident of Avon, in the county of Livingston and State of New York, have invented certain new and useful Improvements in Transmission of Energy by Alternating Currents, of which the following is a specification.

This invention relates to the removal of the difficulties experienced on long lines conducting alternating currents of high voltage and considerable frequency.

It is well known to electrical engineers that the electrostatic capacity of such lines causes a large idle current to flow through the generator and also on the line, interfering with successful and economical transmission of electrical energy. The capacity may be reduced by placing the conductors far apart; but such an arrangement greatly increases the inductance, which is very low when the conductors lie close together, by reason of their mutual induction. I overcome the difficulty by placing the outgoing and return conductors in close mutual inductive relation, as by making them concentric or placing them close together side by side, thereby rendering the line inductance *nil* or very low. Since this inductance is in series relation to the circuit, whereas the capacity is in multiple-arc relation, it has no effect in neutralizing said capacity, and the latter must be overcome by other provisions in order to permit free propagation of energy over the line. I place a series of inductances in parallel relation to one another between the two conductors, distributing them at different points along the line, and these inductances are so calculated that they will render the sections into which they divide the circuit resonant with the rate of alternation of the generator. It is known that in a circuit adjusted or "tuned" to electrical resonance current is in phase with the applied electromotive force, so that by placing inductances of the proper value in parallel I render each section of the line resonant and the difficulties of idle currents and uneconomical transmission are eliminated. The value of the inductance required to produce the proper adjustment may be determined by the following formula:

$$K. \ I = \frac{25,300}{R^2},$$

in which K represents the capacity of any part or section of the line, I the required inductance, and R the rate of alternation of the generator. Suppose, for example, that we have a line one hundred miles in length and we divide it into three-mile sections, and suppose the rate of alternation of the generator to be sixty cycles per second. The line then might have a capacity of one-third of a microfarad per mile. Each section having a capacity of one microfarad can be rendered resonant or completely balanced by placing across the line at the middle of each section an inductance of seven and one thirty-sixth henries, as derived from the above formula. The line, leaving aside the inductance of generators and transformers, which is very small comparatively, and especially when loaded, will then be in a resonant condition.

It has been proposed to transmit speech telegraphically through an ocean cable by interpolating inductances at definite intervals between the outgoing and return conductors. With such an organization, however, the results aimed at and attained by me are impossible. The rates of vibration due to speech are widely different for the different phonetic parts of speech, both in the fundamental sounds and in the overtones which determine their quality or timbre, so that any adjustment which would be resonant for one rate would be far from resonance for others, and it would be impossible to render the line resonant to all. Thus some would pass freely and others would be greatly obstructed or almost entirely shut off. In my system, however, there is but a single rate and the line may be easily adjusted to resonance with that rate. Although there may be one or more harmonics present in the wave of electromotive force given by the alternator, it is the design of my invention to adjust the system for resonance with the fundamental wave or frequency only, neglecting any harmonics which may be accidentally present. The best results are attained when the several sections of the line are adjusted for perfect resonance with a definite rate and that rate is maintained uniform in service. It must be understood, however, that a responsive vibration of the line to the alternations of the generator will take place over a small range of variation from the resonant rate, so that if the generator varies somewhat in speed practical though not the most perfect results may be attained.

My invention comprises an alternating system of transmitting energy for whatever application said transmission may be intended, comprising a generator of practically uniform rate of alternation and a line in which the capacity-inductance product is adjusted for substantial resonance with that rate. It comprises also a line rendered sectionally resonant by making a plurality of sections resonant to the rate of the generator. It comprises also other features more or less generic, which will be hereinafter more fully described, and will be definitely indicated in the claims.

In the accompanying drawing, which illustrates diagrammatically my invention, A is an alternating-current generator, and 1 2 a circuit for transmitting the energy developed by said generator over a long distance.

B is a terminal plant supplied by the generator, and C and D are intermediate plants which may also be supplied.

The consumption-circuits may be directly or inductively supplied from the line and may contain translating devices of any character which may be operated or controlled by periodic currents.

The conductors 1 2 are placed close together and may be made concentric with an intervening tube of insulating material. Such a disposition will reduce the inductance to almost nothing, so that currents may be propagated with almost no drop of electromotive force resulting from inductance. As current in the two conductors is in opposite directions, one carrying outgoing and the other return current, the induced electromotive forces oppose one another, so that the inductance is obliterated.

E, E', and $E^2$ are inductances, which may be made of wire wound on a laminated core of iron. The terminals of each coil are connected with the line conductors.

As an example of the economy of a system organized in accordance with my invention, let us assume it to be required to transmit four hundred kilowatts over a line one hundred miles in length at a voltage of thirty thousand and at sixty alternations per second. Suppose the line is formed of two No. 4 copper wires supported on poles and twelve inches from each other. The resistance of the lines (two hundred miles) would be two hundred and sixty ohms. The inductance of a loop twelve inches wide one hundred miles long would be .3 henry. The current necessary at thirty thousand volts to give four hundred kilowatts is 13.3 amperes. The drop due to resistance alone is three thousand four hundred and sixty volts. The drop due to resistance and inductance is three thousand eight hundred volts, or a little over twelve per cent. The capacity of the lines for one hundred miles is 1.26 microfarads. The capacity per mile is therefore .0126 microfarad. The total amount of charging-current that would flow into the conductors from the generating end would be fourteen amperes. Fourteen multiplied by thirty thousand or four hundred and twenty kilowatts represents the apparent energy flowing in and out of the lines when they are open at the farther end. The loss due to heating by this fourteen amperes can easily be found. The effect would be practically the same as if a condenser of 1.26 microfarads be placed fifty miles from the station. The loss would then be that due to fourteen amperes for one hundred miles. The resistance for one hundred miles is one hundred and thirty ohms. Therefore $C^2R$ equals $14^2$. One hundred and thirty equals twenty-five thousand four hundred and eighty watts, or, in round numbers, 25.5 kilowatts. Therefore at no load four hundred and twenty kilowatts apparent energy leaves the station and causes twenty-five kilowatts of heating on the lines, giving a power factor of six per cent. At full load—that is to say, four hundred kilowatts at the receiving end—four hundred and fifty kilowatts (real) must leave the station to get four hundred at the receiving end, due to legitimate losses, twenty-five kilowatts (real) to heat the lines, and four hundred and twenty kilowatts (idle) to charge the lines. Combining these vectorially, as four hundred and twenty kilowatts is wattless, gives six hundred and thirty-five kilowatts as the necessary capacity of generators to supply four hundred kilowatts at the receiving end, giving a power factor of seventy per cent.

Now let us assume the same case, all conditions remaining the same, except that the system is made sectionally resonant by placing inductances across the lines at distributed points. The inductances must be so planned that they will be in resonance with the capacity of that section of the line in which they are placed for the given frequency. Let us suppose they are placed every three miles. The capacity of three miles is .0378 microfarad. The inductance necessary to produce resonance is $$\frac{25,300}{R^2 K},$$

R representing the frequency (60) and K the capacity (.0378) or one hundred and eighty-three henries, which will admit .43 ampere at thirty thousand volts. By using No. 22 or No. 23 wire a calculation will show that to give the required inductance about thirty pounds of wire and fifty pounds of iron must be employed. Since thirty-three inductances must be employed, one for each section, the total weight of wire will be nine hundred and ninety pounds and of iron sixteen hundred and fifty pounds. The loss in copper of all thirty-three is two thousand seven hundred and fifty watts, and the loss in iron four thousand three hundred and fifty-six watts, or a total loss of seven thousand one hundred and six watts in the inductances. The current to supply this loss sent from the generating-station would be 8.5 watts. The .43 ampere flowing through the inductances .21 from each side along the line also causes a slight loss of six watts. Hence 7120.5 watts, or about seven and one-eighth kilowatts, supplied from the station will, when the system is made sectionally resonant, avoid twenty-five kilowatts of loss on the lines and four hundred and twenty kilowatts apparent at the generating end, which would be necessary were no precautions taken. The power factor would be nearly one hundred per cent. At full load, as before, we have four hundred and fifty kilowatts necessary to give four hundred kilowatts at the distant station with twelve per cent. drop and seven kilowatts to supply inductances, thus making the required capacity of the generator four hundred and fifty-seven kilowatts as against six hundred and thirty-five kilowatts in the first case—that is to say, the generator might be less than three-fourths as large. With lines possessing more capacity, such as underground systems of concentric conductors, the saving would be a great deal more.

Two other very important functions of the inductances placed in my system are that by keeping idle currents off the line they improve the regulation of the system, getting rid of all drops in voltage caused by these currents, and they prevent the formation of high local voltages at points along the line which are liable to break down the insulation. The resulting advantages of decreased size of apparatus applies not only to the generator but also to the transformers. The great apparent energy at no load is almost as much of a disadvantage at the generating end as if it were real energy, as the heat losses, the strains on the machines, insulation, &c., are just as great. In fact, this enormous load would make transmission over the supposed line at sixty alternations per second almost prohibitive by the ordinary plan and a much lower frequency would have to be employed, requiring heavier and more expensive apparatus and thus interfering with a successful operation of lamps by reason of flickering.

Having thus described my invention, what I claim as new, and desire to secure by Letters Patent, is—

1. As a means of transmitting periodic currents of uniform rate, a generator having a definite rate, a circuit containing a plurality of inductances in multiple arc, said inductances being proportioned to render the line resonant with the periodic electromotive force.

2. A system of transmission for alternating currents comprising an alternating-current generator of definite fundamental rate and a circuit containing inductances connected in parallel at intervals, said inductances being proportioned to produce resonance of the circuit with the generator.

In testimony whereof I have hereunto subscribed my name this 18th day of March, A. D. 1896.

CHARLES S. BRADLEY.

Witnesses:
ROBT. H. READ,
W. L. SAWYER.